(12) United States Patent
Foy et al.

(10) Patent No.: US 12,125,044 B2
(45) Date of Patent: Oct. 22, 2024

(54) PERSONALIZED CUSTOMER SERVICE FOR RIDEHAIL VEHICLE PASSENGERS

(71) Applicant: GM Cruise Holdings LLC, San Francisco, CA (US)

(72) Inventors: Theresa Foy, San Francisco, CA (US); Leah Meyerholtz, San Francisco, CA (US); David J. Shuckerow, Seattle, WA (US); Christopher Warren, Seattle, WA (US); Qingxuan Li, San Mateo, CA (US); Yosser Andres D'Avanzo, Brandon, FL (US); Minjie Tong, Issaquah, WA (US); Livia Johanna, San Francisco, CA (US); Bridget Collins, San Francisco, CA (US); Daniel Paul Thengvall, San Francisco, CA (US); Jyothi Babu Araja, San Francisco, CA (US); Steven Sturkop, San Francisco, CA (US); Hailun Zhou, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 196 days.

(21) Appl. No.: 17/940,342

(22) Filed: Sep. 8, 2022

(65) Prior Publication Data
US 2024/0005335 A1  Jan. 4, 2024

(30) Foreign Application Priority Data

Jun. 29, 2022  (IN) .............................. 202241037308

(51) Int. Cl.
*G06Q 30/00* (2023.01)
*G05D 1/00* (2006.01)
(Continued)

(52) U.S. Cl.
CPC ......... *G06Q 30/016* (2013.01); *G05D 1/0027* (2013.01); *G05D 1/0088* (2013.01);
(Continued)

(58) Field of Classification Search
None
See application file for complete search history.

(56) References Cited

U.S. PATENT DOCUMENTS 9,971,348 B1 * 5/2018 Canavor ............. H04W 12/065
10,482,226 B1 * 11/2019 Konrardy ............ B60R 21/0136
(Continued)

OTHER PUBLICATIONS

Kim, Sangwon, et al. "Autonomous Taxi Service Design and User Experience." International Journal of Human-Computer Interaction, vol. 36, No. 5, pp. 429-448, Aug. 2019. (Year: 2019).*
(Continued)

*Primary Examiner* — Luis A Brown

(57) ABSTRACT

There is disclosed a method of providing rider service for an autonomous vehicle (AV) system, including operating an AV to provide a trip to a passenger; associating the passenger with a unique passenger identifier (UPID); receiving passenger metadata for the passenger according to the UPID; and responding to a rider service instance, comprising customizing the response according to the UPID and the passenger metadata.

20 Claims, 8 Drawing Sheets

(51) Int. Cl.
*G06Q 30/016* (2023.01)
*G06Q 50/40* (2024.01)
*G08G 1/00* (2006.01)

(52) U.S. Cl.
CPC ........... *G05D 1/0291* (2013.01); *G06Q 50/40* (2024.01); *G08G 1/202* (2013.01)

(56) References Cited

U.S. PATENT DOCUMENTS

| | | | |
|---|---|---|---|
| 2016/0210033 A1* | 7/2016 | Gagneraud | G06F 3/04847 |
| 2016/0334230 A1* | 11/2016 | Ross | G05D 1/0027 |
| 2016/0334797 A1* | 11/2016 | Ross | G05D 1/0027 |
| 2017/0090480 A1* | 3/2017 | Ho | B60W 30/00 |
| 2017/0213165 A1* | 7/2017 | Stauffer | G06Q 10/02 |
| 2019/0232974 A1* | 8/2019 | Reiley | G06V 40/168 |
| 2020/0249036 A1* | 8/2020 | Ha | G01C 21/3438 |
| 2021/0004706 A1* | 1/2021 | Riddle | G06F 40/30 |
| 2021/0286634 A1* | 9/2021 | Sakai | H04L 67/06 |
| 2021/0286651 A1* | 9/2021 | Ho | G06F 3/061 |
| 2022/0055501 A1* | 2/2022 | Ha | H04W 4/029 |
| 2022/0067813 A1* | 3/2022 | Beaurepaire | G01C 21/3484 |
| 2022/0101399 A1* | 3/2022 | Eidam | G06Q 30/0613 |
| 2022/0169287 A1* | 6/2022 | Beaurepaire | G01C 21/3492 |
| 2022/0182492 A1* | 6/2022 | Skinner | H04M 3/5175 |
| 2022/0270378 A1* | 8/2022 | Kondo | G06V 20/59 |
| 2023/0306693 A1* | 9/2023 | Gerrese | G06V 20/20 |
| 2024/0005335 A1* | 1/2024 | Foy | G05D 1/0088 |
| 2024/0015248 A1* | 1/2024 | Johanna | G06V 20/58 |
| 2024/0059307 A1* | 2/2024 | Johanna | B60W 50/00 |
| 2024/0059313 A1* | 2/2024 | Tong | G05D 1/227 |

OTHER PUBLICATIONS

Nguyen, Van-Linh, et al. "Toward the Age of Intelligent Vehicular Networks for Connected and Autonomous Vehicles in 6G." IEEE Network. (Year: 2022).*

* cited by examiner

PERSONALIZED CUSTOMER SERVICE FOR RIDEHAIL VEHICLE PASSENGERS

CROSS-REFERENCE TO RELATED APPLICATION(S)

This application claims the benefit of and hereby incorporates by reference, for all purposes, the entirety of the contents of IN Provisional Application No. 202241037308, filed Jun. 29, 2022, and entitled, "PERSONALIZED CUSTOMER SERVICE FOR ROBOT TAXI PASSENGERS."

FIELD OF THE SPECIFICATION

The present disclosure relates generally to autonomous vehicles (AVs), and more particularly, though not exclusively, to providing personalization of an onboard assistant for autonomous vehicles.

BACKGROUND

AVs, also known as self-driving cars, driverless vehicles, and ride-hail vehicles, are vehicles that use multiple sensors to sense the environment and move without human input. Automation technology in the AVs enables the vehicles to drive on roadways and to perceive the vehicle's environment accurately and quickly, including obstacles, signs, and traffic lights. The vehicles may be used to pick up passengers and drive the passengers to selected destinations. The vehicles may also be used to pick up packages and/or other goods and deliver the packages and/or goods to selected destinations.

SUMMARY

A method of providing customer service or rider service for an AV system, comprising operating an AV to provide a trip to a passenger; associating the passenger with a unique passenger identifier (UPID); receiving passenger metadata for the passenger according to the UPID; and responding to a rider service instance, comprising personalizing the response according to the UPID and the passenger metadata.

BRIEF DESCRIPTION OF THE DRAWINGS

The present disclosure is best understood from the following detailed description when read with the accompanying FIGURES. In accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

DETAILED DESCRIPTION

Overview

Figure 1:
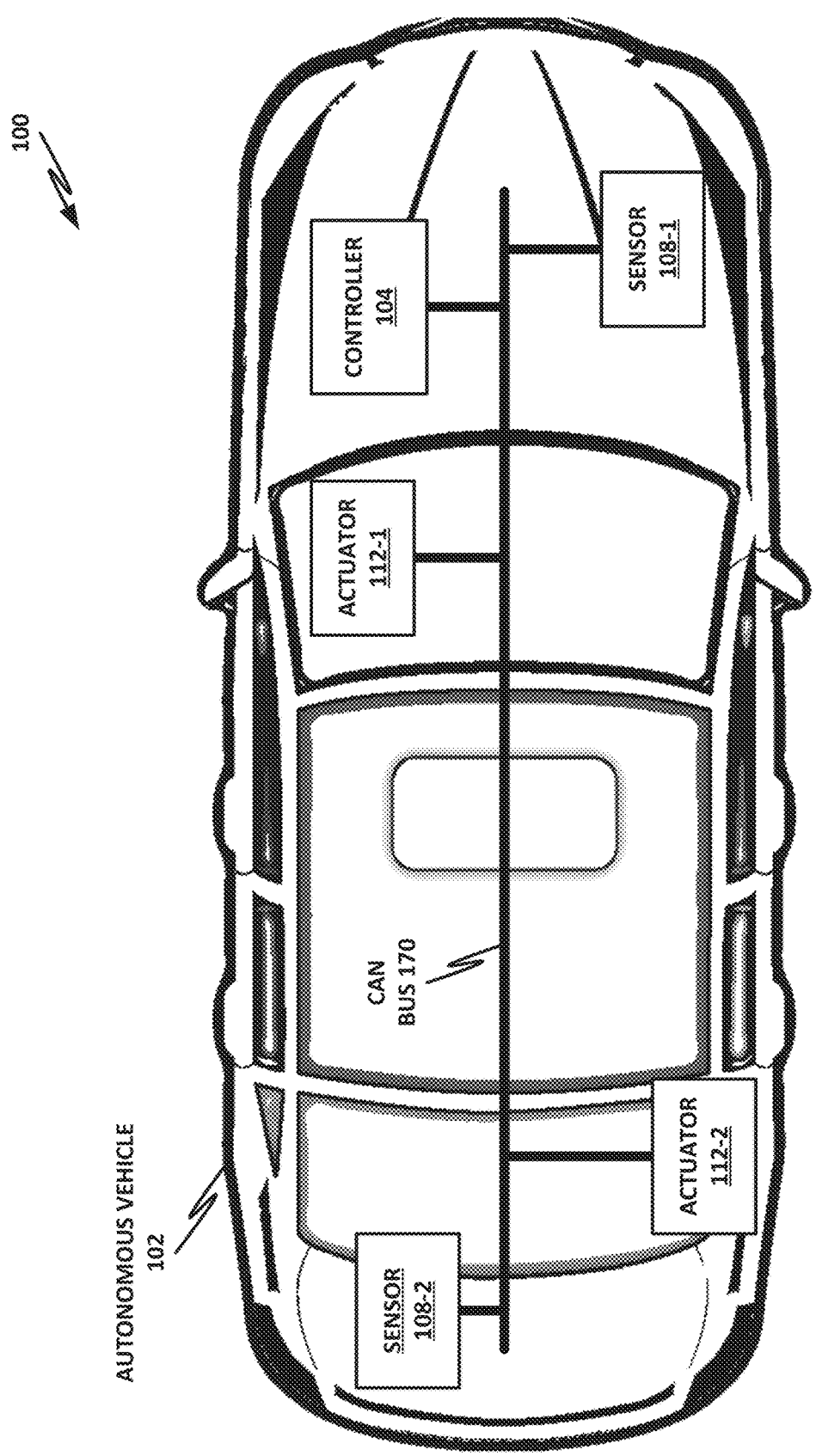
FIG. 1 is a block diagram illustrating an example AV system.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

AVs and vehicles with semi-autonomous features like automatic driver assist systems (ADAS) may include features, such as an onboard assistant. Onboard assistants may handle a range of user interactions, including emergency and non-emergency situations. For example, an onboard assistant may provide a button that a driver or passenger may press to be placed in contact with a service center. Service agents may then speak with the driver or passenger and help address issues or resolve concerns. The onboard assistant may also receive sensor data from the vehicle, and in certain situations may automatically place a call. For example, a call may be placed automatically in the case of a collision, mechanical failure, law enforcement interaction (e.g., the car was pulled over), obstruction, dangerous weather conditions, or similar.

One use case of an AV includes operating a fleet of ride-hail vehicles. These may be ride-hail vehicles that operate without a human driver. As used herein, AV supported ride-hail services may include other services, such as ride-share services and delivery services.

An end user for ride-hail services may install a mobile app on his or her cellular phone or mobile device and may provide profile and/or billing information. Depending on the passenger's privacy preferences, he or she may share additional information that may be used to customize or personalize the ride experience. When the end user needs to go somewhere, he or she may use the ride-hail app to request a ride with a ride-hail vehicle, including a desired destination. The AV operator may have a fleet of ride-hail vehicles and may dispatch a ride-hail vehicle to the end user's destination to pick the passenger up and take him or her to the desired destination.

In the context of a ride-hail vehicle service, an onboard assistant may assume additional significance. As some users may not be familiar or accustomed to ride-hail vehicle services, many users may initially find it unsettling to ride in a car without a human operator, and that may in fact lack human driving equipment altogether (e.g., it may lack a steering wheel, accelerator, brake pedals, etc.). In these cases, the onboard assistant may constitute the sole or at least primary person-to-person interaction for the passenger.

A popular use case for a fully autonomous vehicle is to provide a fleet of AVs that can support a ride-hail (or ride-share) service. A user may install an application on his or her cell phone or mobile device, and use the application to pick a destination and request pickup either now or in the future. A ride-hail vehicle may then be dispatched to pick up the passenger and carry him or her to the requested destination.

In some cases, it may be advantageous to maintain a profile of the passenger (or sometimes referred to as the rider), including personal information that the passenger may voluntarily share via the mobile application, such as routes, music preferences, logistical data, company associations, demographic data, or similar. These data may be useful in personalizing the passenger experience and helping to increase the passenger's enjoyment of the trip. For example, the ride-hail vehicle may play music or other entertainment that the passenger prefers or may provide a suite of games or other interactive content that the passenger may use via a built-in tablet on the ride-hail vehicle.

One challenge that is inherent to a ride-hail vehicle service supported by autonomous vehicles is the lack of one-to-one human interaction. Although the use of a ride-hail vehicle realizes technical efficiency, some users may feel a lack of personal service because they do not interact with a human driver. This sense of personal disconnect may be further aggravated if the user requests rider service support and continuously speaks to different people who seemingly have no historical knowledge of the rider, which may make it difficult for the passenger to feel like he or she is building a personal relationship and thus creating a personal investment in the brand.

Embodiments of the present specification provide AVs, such as ride-hail vehicles, that further personalizes the passenger experience and that may provide, in at least some embodiments, a dedicated rider service representative or rider service team that the passenger may consistently interact with. This personalization may help the AV operator to more effectively and efficiently provide the ride-hail vehicle service and may provide the passenger with an enhanced sense of human connection and brand loyalty.

Embodiments include transforming human and robotic inputs into a combined picture of the vehicles and the rider's needs, which gives the computer systems and the rider service operations the ability to increase the level of rider service and provide benefits to the passenger. For example, using these automated systems, the AV operator may automatically assess conditions with the vehicle and handle situations that otherwise may require a human to manually or physically inspect the vehicle.

Enhanced rider service may be assisted by a rider history table in a database for the onboard assistant. This history table may allow rider support specialists to see the rider's past events, call history, preferences, or other information about the rider to provide a personalized rider service experience. Such visibility may help the rider service agent and the overall system to understand the passenger's history and rides, destinations, calls, types of events, present-state or past user sentiment, or other reactions. Understanding passenger history and rides, destinations, calls, sentiment, and types of events may enable a single rider service representative or response team to provide better and more personalized service to the rider. Enhanced service may increase rider satisfaction and lead to better rider engagement.

Embodiments of a rider service platform may provide a method of operating the AV system. The method may include operating an AV to provide a trip to the passenger and associating the passenger with a UPID that has been previously assigned to the passenger. The UPID may be used to correlate the passenger to current and past trips, known preferences, known sentiment, and similar. The rider service platform may also receive passenger metadata for the passenger according to the UPID and then respond to rider service instance, which may include personalizing the response according to the UPID and the passenger metadata.

The foregoing may be used to build or embody several example implementations, according to the teachings of the present specification. Some example implementations are included here as non-limiting illustrations of these teachings.

Exemplary AV

FIG. 1 is a block diagram 100 illustrating an exemplary AV 102. AV 102 may be, for example, an automobile, car, truck, bus, train, tram, funicular, lift, or similar. AV 102 could also be an autonomous aircraft (fixed wing, rotary, or tiltrotor), ship, watercraft, hover craft, hydrofoil, buggy, cart, golf cart, recreational vehicle, motorcycle, off-road vehicle, three- or four-wheel all-terrain vehicle, or any other vehicle. Except to the extent specifically enumerated in the appended claims, the present specification is not intended to be limited to a particular vehicle or vehicle configuration.

In this example, AV 102 includes one or more sensors, such as sensor 108-1 and sensor 108-2. Sensors 108 may include, by way of illustrative and non-limiting example, localization and driving sensors such as photodetectors, cameras, radio direction and ranging (RADAR), sound navigation and ranging (SONAR), light direction and ranging (LIDAR), GPS, inertial measurement units (IMUs), synchros, accelerometers, microphones, strain gauges, pressure monitors, barometers, thermometers, altimeters, wheel speed sensors, computer vision systems, biometric sensors for operators and/or passengers, or other sensors. In some embodiments, sensors 108 may include cameras implemented using high-resolution imagers with fixed mounting and field of view. In further examples, sensors 108 may include LIDARs implemented using scanning LIDARs. Scanning LIDARs have a dynamically configurable field of view that provides a point-cloud of the region intended to scan. In still further examples, sensors 108 includes RADARs implemented using scanning RADARs with dynamically configurable field of view. Embodiments may include a suite of sensors that collect data about the surrounding environment, which may include, by way of illustrative and non-limiting example, a pressure sensor that detects a flat tire on the vehicle. Additional sensors could also include collision sensors, environmental sensors that may detect adverse weather conditions, internal or external cameras that may detect obstructions or dangerous situations (e.g., someone or something is blocking the AV or otherwise threatening the AV), the presence of rain, fog, smoke, and others. In the same or a different embodiment, sensors may be used to identify a rider sentiment and enable an appropriate response to be provided based on the rider sentiment.

AV 102 may further include one or more actuators 112. Actuators 112 may be configured to receive signals and to carry out control functions on AV 102. Actuators 112 may include switches, relays, or mechanical, electrical, pneumatic, hydraulic, or other devices that control the vehicle. In various embodiments, actuators 112 may include steering actuators that control the direction of AV 102, such as by turning a steering wheel, or controlling control surfaces on an air or watercraft. Actuators 112 may further control motor functions, such as an engine throttle, thrust vectors, or others. Actuators 112 may also include controllers for speed, such as an accelerator. Actuators 112 may further operate brakes, or braking surfaces. Actuators 112 may further control headlights, indicators, warnings, a car horn, cameras, or other systems or subsystems that affect the operation of AV 102.

A controller 104 may provide the main control logic for AV 102. Controller 104 is illustrated here as a single logical unit and may be implemented as a single device such as an electronic control module (ECM) or other. In various embodiments, one or more functions of controller 104 may be distributed across various physical devices, such as multiple ECMs, one or more hardware accelerators, artificial intelligence (AI) circuits, or other.

Controller 104 may be configured to receive from one or more sensors 108 data to indicate the status or condition of AV 102, as well as the status or condition of certain ambient factors, such as traffic, pedestrians, traffic signs, signal lights, weather conditions, road conditions, or others. Based on these inputs, controller 104 may determine adjustments to be made to actuators 112. Controller 104 may determine adjustments based on heuristics, lookup tables, AI, pattern recognition, or other algorithms.

Various components of AV 102 may communicate with one another via a bus, such as controller area network (CAN) bus 170. CAN bus 170 is provided as an illustrative embodiment, but other types of buses may be used, including wired, wireless, fiberoptic, infrared, WiFi, Bluetooth, dielectric waveguides, or other types of buses. Bus 170 may implement any suitable protocol. Bus 170 may also enable controller 104, sensors 108, actuators 112, and other systems and subsystems of AV 102 to communicate with external hosts, such as internet-based hosts. In some cases, AV 102 may form a mesh or other cooperative network with other AVs, which may allow sharing of sensor data, control functions, processing ability, or other resources.

Figure 8:
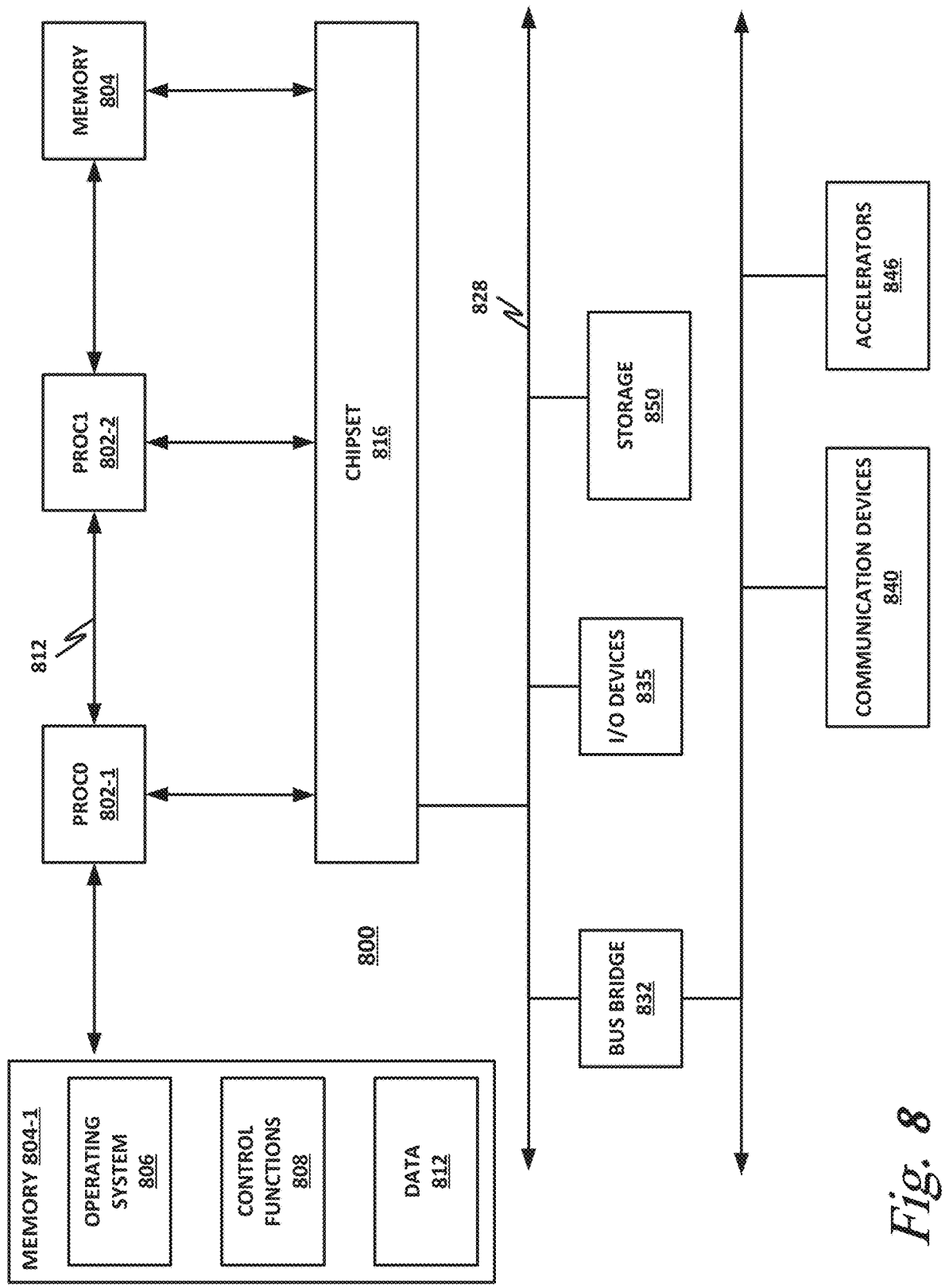
FIG. 8 is a block diagram of selected elements of a hardware platform.

Controller 104 may control the operations and functionality of AV 102, or one or more other AVs. Controller 104 may receive sensed data from sensors 108, and make onboard decisions based on the sensed data. In some cases, controller 104 may also offload some processing or decision making, such as to a cloud service or accelerator. In some cases, controller 104 is a general-purpose computer adapted for I/O communication with vehicle control systems and sensor systems. Controller 104 may be any suitable computing device. An illustration of a hardware platform is shown in FIG. 8, which may represent a suitable computing platform for controller 104. In some cases, controller 104 may be connected to the internet via a wireless connection (e.g., via a cellular data connection). In some examples, controller 104 is coupled to any number of wireless or wired communication systems. In some examples, controller 104 is coupled to one or more communication systems via a mesh network of devices, such as a mesh network formed by AVs.

According to various implementations, AV 102 may modify and/or set a driving behavior in response to parameters set by vehicle passengers (e.g., via a passenger interface) and/or other interested parties (e.g., via a vehicle coordinator or a remote expert interface). Driving behavior of an AV may be modified according to explicit input or feedback (e.g., a passenger specifying a maximum speed or a relative comfort level), implicit input or feedback (e.g., a passenger's heart rate), or any other suitable data or manner of communicating driving behavior preferences.

AV 102 is illustrated as a fully autonomous automobile but may additionally or alternatively be any semi-autonomous or fully autonomous vehicle. In some cases, AV 102 may switch between a semi-autonomous state and a fully autonomous state and thus, some AVs may have attributes of both a semi-autonomous vehicle and a fully autonomous vehicle depending on the state of the vehicle.

AV 102 may take on other forms, including by way of illustrative and non-limiting example, personal vehicles (which may be fully autonomous, or provide hybrid autonomous/driver assist modes), automated cargo vehicles, delivery drones, autonomous trains, autonomous aircraft, or similar. Any such vehicle may benefit from an onboard assistant as described in this specification.

Figure 2:
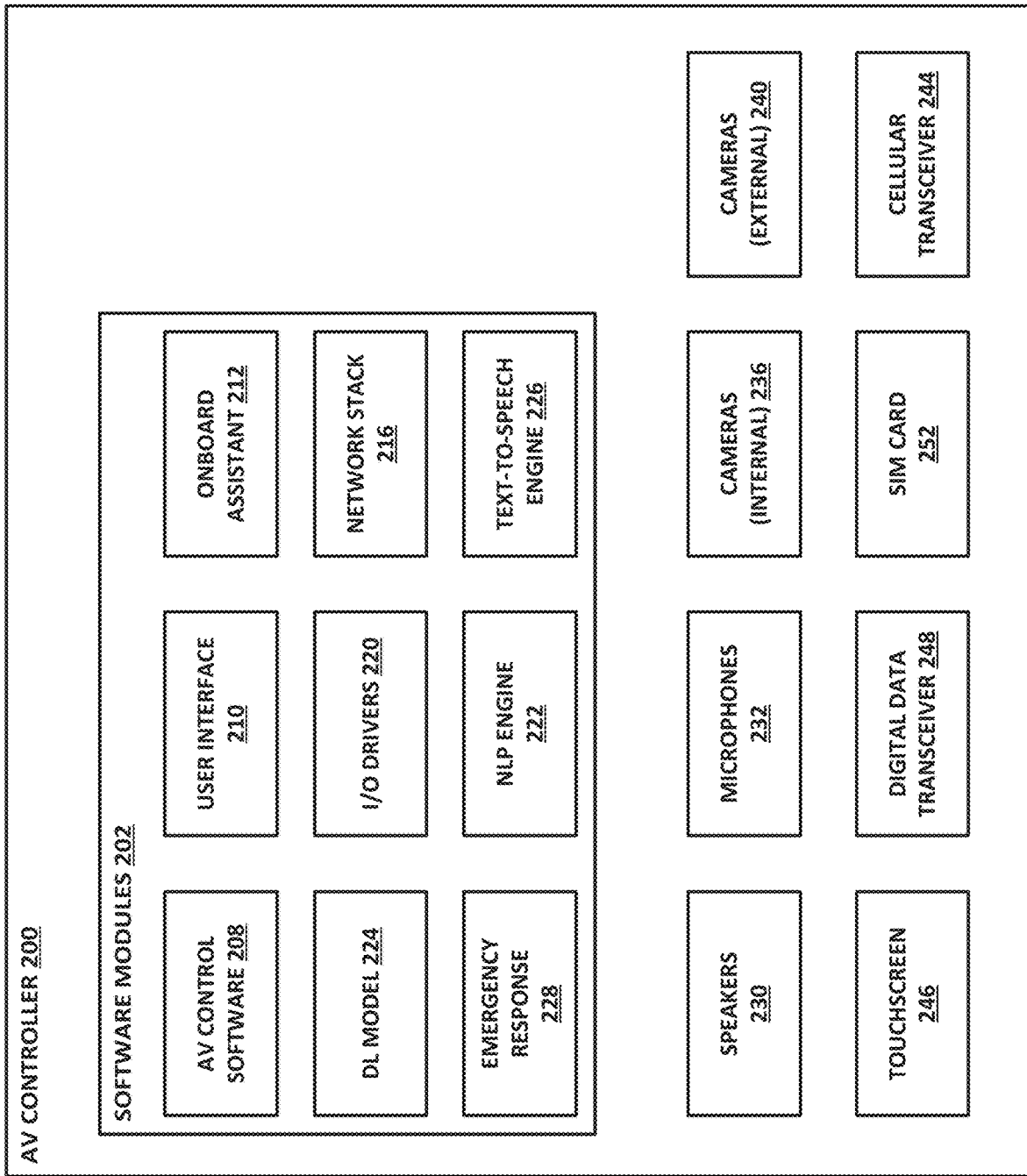
FIG. 2 is a block diagram of selected elements of an AV controller.

FIG. 2 is a block diagram of selected elements of an AV controller 200. Elements disclosed here are selected to illustrate operative principles of the present disclosure. Embodiments may include elements other than those disclosed here, and embodiments need not necessarily include all elements disclosed here.

AV controller 200 may be based on a hardware platform. The hardware platform may include a processor, memory, and other elements to provide the hardware infrastructure for AV controller 200. Examples of additional selected elements of a hardware platform are illustrated in FIG. 8 below.

AV controller 200 may include several peripheral devices that assist the AV controller in performing its function. These may include, by way of illustrative and non-limiting example, speakers 230, microphones 232, internal cameras 236. External cameras 240, touchscreen 246, digital data transceiver 248, subscriber identity module (SIM) card 252, and cellular transceiver 244.

Speakers 230 may be located internally and/or externally to the cabin of the vehicle and may be used to provide audible feedback to an occupant of the cabin of the cabin, or to people outside the vehicle. Microphones 232 may also be disposed within or without the vehicle and may be used to pick up audible cues from the environment. For example, microphones 232 may be used to detect speech, to monitor the environment, or to hear sounds such as sirens, horns, disturbances, or similar.

Internal cameras 236 may be used to monitor the interior of the vehicle, such as to monitor activity of occupants of the cabin of the vehicle. External cameras 240 may be used to monitor the external environment. External cameras 240 may be an integral part of the autonomous operation, which may rely in part on computer vision to identify visual elements of the external environment. Computer vision may enable the AV controller software to provide autonomous or semi-autonomous control of the vehicle. In embodiments, a camera may be used to identify contextual information, such as whether someone outside the car is attempting to block the car (such as in the context of a protest or threat).

Touchscreen 246 may provide an I/O interface for an occupant or passenger of the vehicle. Touchscreen 246 may be similar to a tablet, and may be a standalone device, or may be integrated into the AV as a fixture. In the same or a different embodiment, touchscreen 246 may be provided by a mobile device, laptop computer, or other device owned and provided by the passenger. Touchscreen 246 may provide a facility for the passenger to type messages, send texts, view maps, play games, communicate with the vehicle, communicate with rider support, or perform other actions that may be useful to the passenger or occupant.

Digital data transceiver 248, SIM card 252, and cellular transceiver 244 may form a communication suite. For example, digital data transceiver 248 may provide a network interface to a digital data service, such as a long-term evolution (LTE) fourth-generation (4G) service, a fifth-generation (5G) service, or some other similar wired or wireless digital data service. Digital data transceiver 248 may communicatively couple AV controller 200 to the internet or to other network services. SIM card 252 may operate with cellular transceiver 244 to provide voice communication via cellular communication networks. Sim card 252 provides a unique identity on the cellular network and may provide, for example, a phone number or other identifier for AV controller 200. Cellular transceiver 244 may include the hardware, software, and firmware elements to provide communication with a voice-based cellular communication network.

In embodiments, cellular transceiver 244 may be either a digital or an analog cellular network connection. In the case of a digital connection, cellular transceiver 244 may digitize voice communications and optionally compress data before sending the data over the cellular network.

AV controller 200 may also include a plurality of software modules 202. Software modules 202 may run on an operating system, such as an embedded or real-time operating system provided by AV controller 200. Software modules 202 provide various functions and facilities and may interact with appropriate hardware elements in performing their functions. The division of software elements within software modules 202 is provided as a logical division and is not necessarily representative of a physical division. In some cases, various software modules may run as dedicated services or microservices on AV controller 200 and may be isolated or sandboxed from one another. In other cases, some software modules may be bundled into a single physical or logical software module. Other configurations are possible.

AV control software 208 may include the primary logic for operating the AV. In the case that AV is fully autonomous (e.g., "L4" or higher, as defined by the society of automotive engineer (SAE)), AV control software 208 may have full control of the vehicle. In that case, a passenger or occupant of the vehicle may have no access to controls such as the accelerator or steering wheel. The system may be, for example, a ride-hail vehicle service, or a privately owned vehicle that is self-driving.

AV control software 208 receives data, for example, from speakers 230, cameras 236, 240, and other sensors as illustrated in FIG. 1. AV control software 208 may use AI, such as a deep learning (DL) model 224 to make control decisions for the AV. A single DL model 224 is illustrated in this figure, but in many embodiments multiple DL models are provided, and provide different functionality. In some cases, DL models 224 may be provided to enable not only the core AV control functionality, but to provide support functions such as those provided by onboard assistant 212.

AV controller 200 may also include a user interface 210. User interface 210 may be used, for example, to drive touchscreen 246, or to provide other interactions for a user, occupant, or passenger of the vehicle.

I/O drivers 220 may provide a software stack that enables communication between software modules 202 and various hardware elements such as those illustrated for AV controller 200.

A network stack 216 may be provided to communicatively couple AV controller 200 to an external network such as the internet, an intranet, or some other data communication network. Network stack 216 may communicate via digital data transceiver 248. Network stack 216 may also provide services for cellular transceiver 244.

AV controller 200 may include an onboard assistant 212. Onboard assistant 212 provides features that are useful to the passenger of the AV. Onboard assistant 212 may monitor for conditions that may trigger a session between the AV and a service agent. Onboard assistant 212 may be a client application that communicates with an AV operator to allow the passenger to interact with the service agent. The client application may establish a connection between the AV and the service agent when a session is triggered. The client application may transmit information such as sensor data or state of the user interface 210 from the AV controller 200, to the AV operator for facilitating the interaction with the service agent.

AV controller 200 may include an emergency response module 228. Emergency response module 228 may handle a special case or subset of the functions of onboard assistant 212. Emergency response module 228 may specifically be concerned with handling emergency conditions, such as a collision, mechanical failure, or other condition that poses a danger to the occupant or to the vehicle or both. Emergency response module 228 may be a client application that communicates with an AV operator or emergency services to handle such emergency conditions.

AV controller 200 may also include a natural language processing (NLP) engine 222, which may be used to understand verbal commands, queries, and other interactions with the passenger. For example, if the passenger speaks within the cabin of the AV, then microphones 232 may pick up the voice, and NLP engine 222 may use machine learning (such as DL model 224) to transcribe the spoken word. NLP engine 222 may also use a machine learning model to attempt to understand what the passenger has said and formulate a response.

Text-to-speech engine 226 may translate the response into human perceptible speech patterns, which may be driven to speakers 230. Text-to-speech provides real-time direct interaction between the passenger and the AV.

Exemplary System Involving a Fleet of AVs

Figure 3:
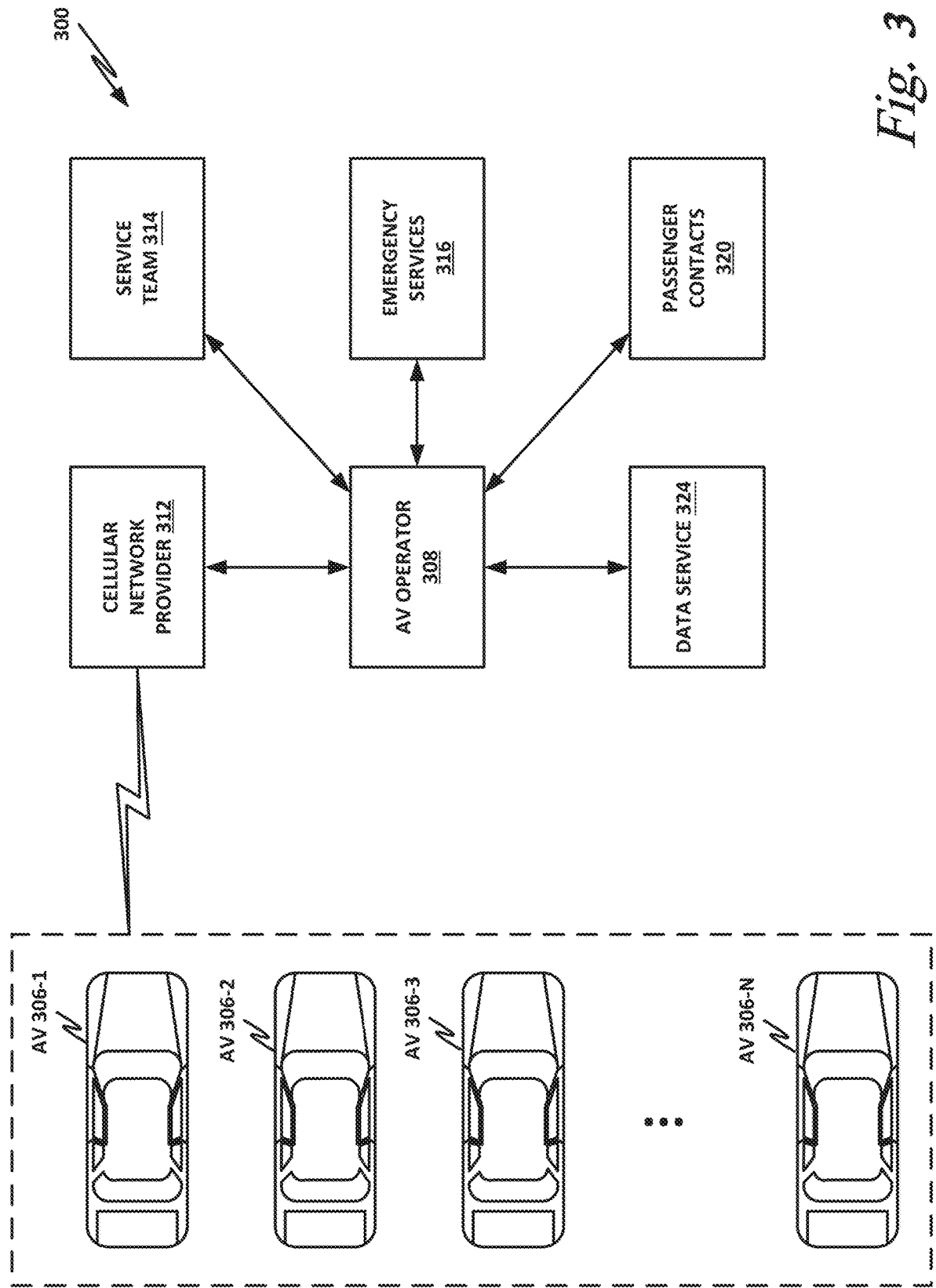
FIG. 3 is a block diagram illustration of selected elements of an AV system.

FIG. 3 is a block diagram illustration of selected elements of a system 300 involving a fleet of AVs. In this illustration, AV operator 308 may operate and include a fleet of AVs 306 and the infrastructure that manages and supports the fleet of AVs. Namely, illustrated here are AVs 306-1, 306-2, 306-3, through 306-N. AV operator 308 may include data centers, computer resources, electronic intelligence, and human operators including human service representatives or service agents. Human service representatives may have a user interface on which they may view AVs 306 within the fleet, including their GPS location, speed, destination, number of passengers, and other information. The user interface may be, for example, a graphical user interface (GUI), web interface, command-line interface (CLI), textual user interface (TUI), virtual reality (VR) interface, augmented reality (AR) interface, or other.

In some cases, and AV 306 (or rider of AV 306) may encounter an event or special condition that triggers a response by an onboard assistant, such as onboard assistant 212 of FIG. 2. Triggering events may include emergency or non-emergency events. For example, a triggering event that activates the onboard assistant may include a passenger pressing a hardware or software button, which initiates a call with the AV operator. In another example, a user asks a simple question which does not require further intervention from a service agent. In that case, the onboard assistant may autonomously answer the question and the interaction may stay local within the AV 306.

In cases where further intervention is required, AVs 306 may place a call or establish a communication session, e.g., via cellular network provider 312, to AV operator 308. Cellular network provider 312 may then provide a voice, video, or multi-media link between the AV 306, the passenger, and AV operator 308. In some cases, the call is initially placed as a conference call with the AV operator 308 in control of the conference call. The use of a conference call may enable AV operator 308 to manage the call, to add or remove parties as necessary, and to otherwise maintain contact with AV 306 and the passenger without interruption. In some cases, establishing the call as a conference call initially means that the passenger need not be placed on hold if AV operator 308 needs to involve other parties. For example, AV operator 308 may connect to a service team 314. The team could be an internal service team, or an outside service contractor. Service team 314 may help to resolve complaints, concerns, feedback (positive or negative), questions, or other service issues.

In some cases, a data service 324 may provide information to AV operator 308 and/or service team 314. For example, the passenger may book a ride with a ride-hail vehicle via a ride-hail application. The application may include a user account, wherein the rider opts to provide to provide and share certain information with AV operator 308. Information could include personally identifying information (PII) about the passenger, a phonebook of contacts, an emergency contact, user preferences, common routes and destinations, or similar. AV operator 308 may share information from data service 324 according to the terms of a license agreement, and according to a present need. For example, if service team 314 needs information from data service 324, then AV operator 308 may provide the information to service team 314.

In the case of an emergency, it may be desirable to provide other connections. For example, AV operator 308 may communicate with emergency services 316 to dispatch emergency crews to a current location of AV 306 to assess the situation and to provide aid to the passenger as necessary. AV operator 308 may cooperate with emergency response module 228 of FIG. 2 to provide information to emergency services 316 to facilitate dispatch of emergency crews or other emergency services. In some cases, data service 324 may include a list of known passenger contacts 320, or the passenger may use a mobile device such as a cell phone to share emergency contact with the onboard assistant. In the case of an emergency, AV operator 308 may contact an emergency contact on behalf of the passenger.

In other examples, the passenger may simply wish to place a call to one of his or her contacts, in which case AV operator 308 may connect the call and then, if appropriate, remove itself from the call so that there is a direct communication between the passenger and the passenger contact. In the same or a different embodiment, the onboard assistant may connect the passenger directly to a contact, without including AV operator 308.

As described above, the onboard assistant need not provide strictly emergency services. For example, data service 324 could also include a provider of games, movies, music, or other entertainment. AV operator 308 may stream entertainment content to an AV 306 via cellular network provider 312 or some other communication network.

In the same or a different embodiment, data service 324 may also provide useful information such as weather reports, traffic reports, breaking news, incident reports, or other. For example, the onboard assistant may use information from data service 324 to determine that adverse weather has made the planned route less desirable. As an illustration, the data service 324 may report a flash flood watch or flash flood warning, and the onboard assistant may determine that the planned route includes low water crossings. In that case, the onboard assistant may reroute to provide a better trip experience. The data service 324 may also provide information that could similarly be used to reroute to avoid construction, traffic, congestion, adverse conditions (e.g., civil unrest, a structural fire, a dangerous gas leak, etc.), or other conditions that affect the safety and/or desirability of the planned route.

AV operator 308 may also provide advice to the passenger in the event of other non-emergency situations that may nevertheless be stressful or uncomfortable. For example, if a police officer pulls over the ride-hail vehicle, AV operator 308 may establish a call with an AV 306 via the onboard assistant, and help the passenger to remain calm, answer questions for the passenger, or assist the passenger in interacting with the law enforcement official.

Other illustrative functions of an onboard assistant may be seen throughout this specification.

Exemplary Method of Providing Onboard Assistance to a Passenger of an AV

Figure 4:
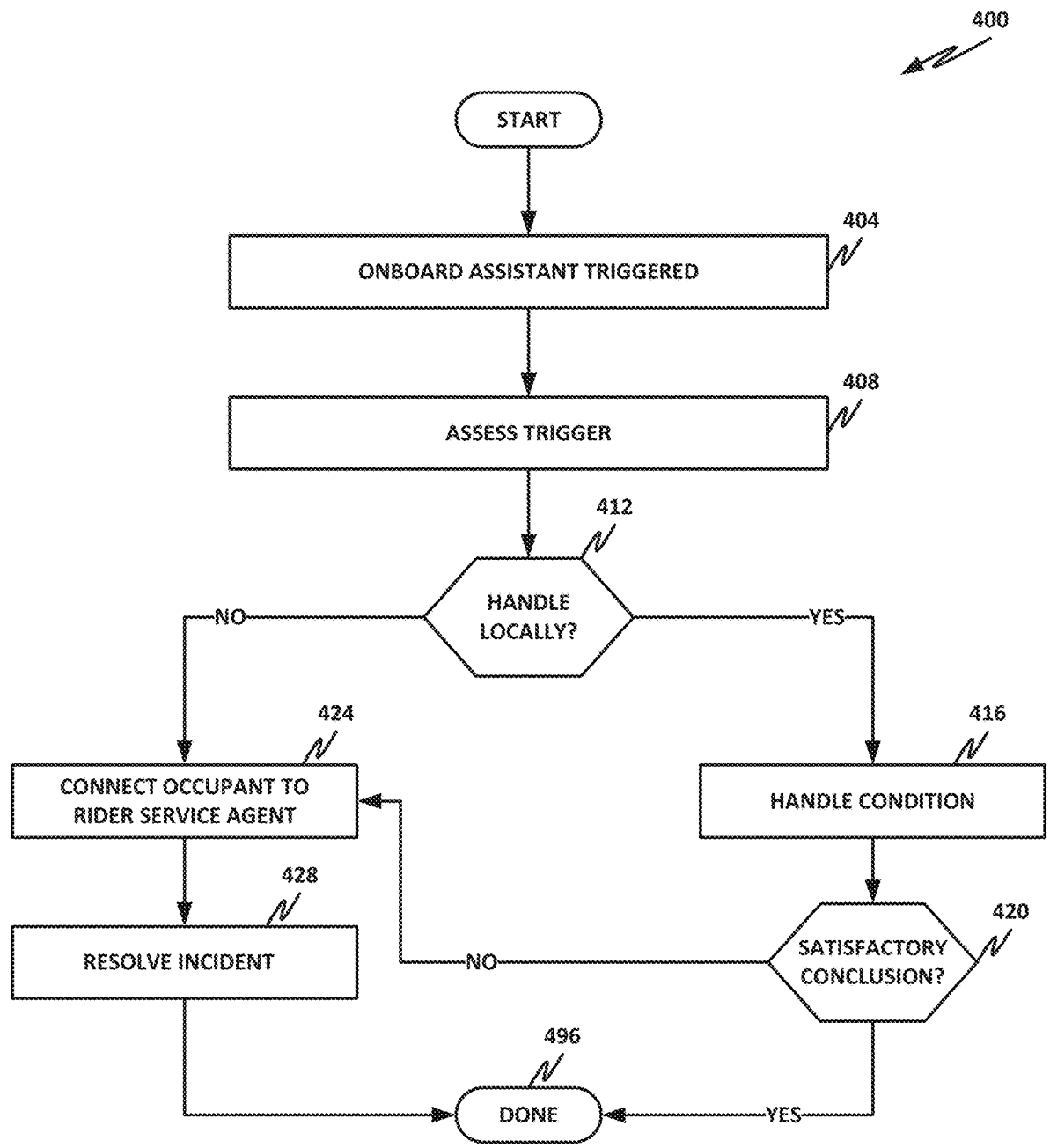
FIG. 4 is a flowchart of selected elements of a method of providing onboard assistance to a passenger of an AV.

FIG. 4 is a flowchart of method 400 of providing onboard assistance to a passenger of an AV.

In block 404, an appropriate event, often referred to herein as a service incident or a service instance, triggers the onboard assistant (e.g., onboard assistant 212 of FIG. 2). As discussed above, this could be an emergency or non-emergency event. For example, the event may include a button push by the passenger, an accident, a law enforcement interaction, hazardous weather, civil unrest, a hazard, a service complaint, problematic behavior by the passenger, or other event.

In block 408, the onboard assistant may assess the trigger to determine the appropriate response. In particular, the onboard assistant may determine whether the incident is to be handled locally (e.g., by the AV controller 200 and/or onboard assistant 212 of FIG. 2) or remotely (e.g., by the AV operator 308 and/or service team 314 of FIG. 3). In some cases, although not illustrated in FIG. 4, an incident can be handled locally and remotely in combination.

In decision block 412, the onboard assistant decides whether to handle the interaction locally, according to the assessment of block 408. If the interaction is to be handled locally, then in block 416, the AV controller handles the interaction, which may include, for example, handling a user request to stream entertainment services, answering questions from the user, determining that the user has asked to be let out of the AV early, or performing some other function that the AV controller may handle on its own without outside intervention.

In decision block 420, the AV controller determines whether there was a satisfactory conclusion to the onboard assistance trigger, or whether additional action is necessary. If the interaction was successfully handled, then in block 496 the method is done.

Returning to decision block 420, if there was not a satisfactory conclusion, and if it is necessary to involve an outside agent, then control may pass to block 424.

Returning to decision block 412, if the interaction cannot be handled locally, then control passes to block 424. Within block 424, either because the AV controller initially decided not to handle the interaction locally, or because the AV controller was unable to satisfactorily conclude the interaction, the AV controller may communicatively couple to the AV operator, for example, to rider service or rider service. Connecting to rider service may enable the occupant to talk with a human rider support agent, or to interact with a device that has more capability than the onboard AV controller. Such a device may include a service agent, or some other agent of the AV operator. In some cases, this may also include connecting to emergency services or other third parties, to ensure that the user receives timely assistance in the event of an emergency or non-emergency incident.

In block 428, the incident is resolved with the intervention of appropriate human or other actors.

In block 496, the method is done.

Exemplary Method of Filtering and Transforming Sensor and State Logs to Facilitate Handling of a Service Incident Triaging and routing service incidents efficiently is not trivial. When there is a large fleet of vehicles, addressing a variety of service incidents effectively can be a challenge, when different service incidents warrants and can benefit from different types of service agents and different standard operating procedures. Efficiency in handling service incidents can be important because the level of satisfaction of a rider depend largely on how quickly a service incident is resolved. Efficiency in handling service incidents is also important from the operations standpoint to ensure that service incident response resources are spent effectively. Routing a service incident to an inappropriate service agent can waste time and resources. AV sensor data, such as sensor logs and state logs of the AV, can be voluminous and cryptic to the point that humans cannot process quickly or make sense of the data at all. Some AV sensor data (e.g., radar data, numerical digital sensor readings) may also be difficult for humans to comprehend or analyze quickly to enable efficient triaging and routing of service incidents. To address some of these issues, data science and machine learning methods can be used at one or more different points of the service incident handling process. In some instances, data science and machine learning methods can be applied at either the filter/transformation stage or at the expert engine. In some instances, data science and machine learning methods can be applied at the filter/transformation stage and separately at the expert engine. In some instances, one model combining both models can be implemented, e.g., the model can be a deep neural network that can perform filter/transformation of data and prediction/decision/recommendation.

Figure 5:
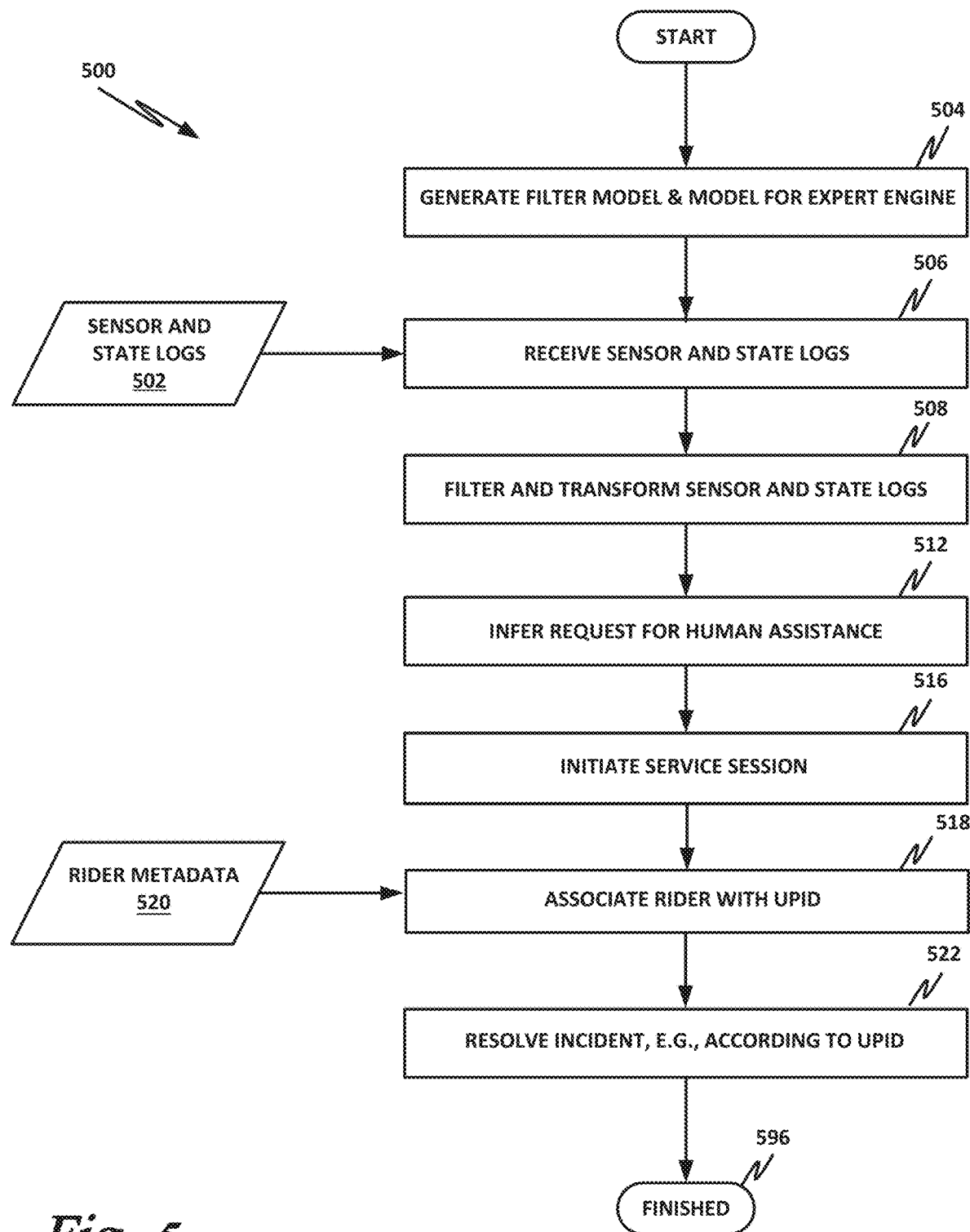
FIG. 5 is a flowchart of a method of handling a rider service incident within an AV.

FIG. 5 is a flowchart of a method 500 of handling a service incident within an AV. For example, the vehicle may be an AV or a semi-autonomous vehicle. In the case of an AV, the AV may be a ride-hail vehicle.

In block 504, an AV operator (e.g., AV operator 308 of FIG. 3) may generate a filter model using data science and machine learning methods, where the filter model can appropriately filter and transform sensor inputs to provide useful and meaningful inferences about a state of the vehicle. An AV operator may generate a model for an expert engine that can be used to appropriately route a service incident to the appropriate service agent or apply the appropriate standard operating procedures.

Generating the filter model may include, for example, training the model on labeled real or simulated sensor data, such as real or simulated sensor data, with or without labels (e.g., classes of different states of the AV). In some cases, the process of training the filter model can yield filter thresholds, sensitivities, or other values that can be used in the filter model to deduce the state of the vehicle. In some cases, the trained model can yield classes representing different states of the vehicle. In some cases, the trained model can yield outputs that indicate the state of the vehicle. In some cases, the trained model can indicate whether a special condition exists (e.g., an emergency situation or non-emergency situation).

Generating the model for the expert engine may include, for example, training the model on labeled real or simulated sensor data, such as real or simulated sensor data, with or without labels (e.g., predictions/decisions/recommendations). In some cases, the trained model can take sensor data or a derivation of the sensor data as input and yield predictions/decisions/recommendations for handling a specific service incident.

In block 506, the onboard assistant (e.g., onboard assistant 212 of FIG. 2), and/or AV operator (e.g., AV operator 308 of FIG. 3) receives sensor and state logs 502, e.g., from an AV controller. In some cases, the onboard assistant may provide decisions based on (transformed) sensor and state logs.

In some cases, receiving sensor data may include receiving state logs for the vehicle. State logs may track the states of state machines within the AV controller. The status of the state machines may be used to infer operational conditions. A state log may include historical states for state machines within the AV. Sensor data may also include sensor logs for the vehicle. Logs may include stored values for a plurality of sensors, which may be useful in tracking trends of data or instrumentation over time.

In some cases, the sensor data may also include sensor logs for the vehicle. Logs may include a number of stored values for a plurality of sensors, which may be useful in tracking trends of data or instrumentation over time. The sensor data may also include trip information for planned or ongoing trip of the vehicle. The sensor data may also comprise current location information for the vehicle along with other information, such as speed and direction. The sensor data may also include data from a collision sensor. For example, the sensor data may inform the AV controller if the vehicle has been in a collision. The sensor data may also include an environmental sensor, which may sense environmental conditions such as low light conditions, fog, rain, snow, wind, or other environmental conditions that may affect operation of the vehicle. The sensor data may also comprise a tire pressure sensor, which may be used, for example, to determine that the vehicle has encountered a flat tire without requiring a human service operator to physically check the vehicle. The sensor data may also include data about external obstructions or obstacles. These could include roadblocks, stopped cars, accidents, protests, hazards, fires, or other obstructions that may affect operation of the vehicle. Such obstructions may require the vehicle to reroute or to stop, and in those cases, it may be useful to connect the passenger with a service agent to help resolve any concerns.

In some cases, the sensor data may include information from service session(s) associated with the vehicle. For example, if a previous service session exists for the vehicle, then appropriate (historical) information may be provided from the previous service session and may help the onboard assistant to make decisions about the current special condition. Historical information from service session(s) associated with the vehicle can include historical sensor data that triggered the previous service session(s), historical rider sentiment data associated with the previous service session(s), and resolution or steps executed to resolve the previous service session(s).

In some cases, the sensor data may include sensor data which indicates rider sentiment. Sensor data that may indicate rider sentiment includes sensor data relating to vital signs monitoring, video data of the cabin, audio data of the cabin, rider profile data, seat occupancy sensor data, seat temperature sensor data, etc.

In block 508, the onboard assistant (e.g., onboard assistant 212 of FIG. 2), and/or AV operator (e.g., AV operator 308 of FIG. 3) may filter and transform sensor and state logs, e.g., using the trained model, to provide inferences for the state of the AV. In some cases, filtered/transformed sensor and state logs are generated in block 508. An onboard assistant for the AV may filter the sensor data before transforming the sensor data. For example, filtering may include removing unnecessary data points, removing unnecessary values, combining data, or otherwise conditioning the data. The transforming of the sensor data may include generating inferences about the state of the AV, or determine whether the sensor data indicates a special condition.

In some embodiments, data science and machine learning methods can be applied, in block 504, to generate a filter/transformation model to filter/transform AV sensor data, in block 508, into data which can be used readily for routing to different service agents or different standard operating procedures. Preferably, the transformed data can provide inferences or insights into the state of the AV (and even the rider) in ways that a human cannot. For instance, the transformed data include a summary or digest of possible issue(s) of the AV and/or the rider. In another instance, the transformed data include flag(s) of certain sensor data as being anomalous or needs attention. In yet another instance, the transformed data can include one or more probabilities that the AV is in one or more defined states. In yet another instance, the transformed data includes a reduced or condensed set of sensor data, removing any data that is not suggestive or determinate of a possible issue. In yet another instance, the transformed data includes a feature vector representing values of salient features of the AV sensor data.

The filter/transformation model can be a supervised model, where training of the model is performed using labeled data. The filter/transformation model can be unsupervised, where training of the model is performed without labeled data. In many circumstances, such a model can often detect and extract salient information from AV sensor in ways that human cannot. Examples of data science and machine learning methods applicable for transforming data includes: neural networks, convolutional neural networks, support vector machines, regression, clustering, deep learning, time-series regression analysis, etc.

In block 512, the onboard assistant (e.g., onboard assistant 212 of FIG. 2), and/or AV operator (e.g., AV operator 308 of FIG. 3) may infer, based on sensor logs, filtered/transformed sensor and state logs, rider sentiment, and/or other data, that the passenger has expressly requested assistance. Alternatively, the onboard assistant (e.g., onboard assistant 212 of FIG. 2), and/or AV operator (e.g., AV operator 308 of FIG. 3) may infer contextually that the passenger requires assistance. In some cases, the passenger may not be able to expressly ask for assistance, such as in the case of the passenger experiencing a medical emergency wherein the passenger loses consciousness or has difficulty speaking. In such cases, it may be beneficial for the AV controller to place an automated call to a service agent, who may help the passenger without an explicit request.

In block 516, the AV operator (e.g., AV operator 308 of FIG. 3) may contact a service organization (e.g., service team 314 of FIG. 314) and initiate a service session to provide the necessary help for the passenger, so as to implement a standard operating procedure suitable for a given service incident. Interactions may range from asking questions, filing complaints, and modifying services to interacting with emergency personnel, handling a law enforcement interaction, or handling a serious accident or collision.

In some cases, the onboard assistant (e.g., onboard assistant 212 of FIG. 2), and/or AV operator (e.g., AV operator 308 of FIG. 3) may infer that a special condition for the vehicle requires intervention, either from the AV controller or from an outside human user. The onboard assistant (e.g., onboard assistant 212 of FIG. 2) optionally receives instructions (e.g., suitable standard operating procedures) for handling the special condition in accordance with the service session.

In cases where external service support is needed, initiating a service session may include contacting a service representative and placing an occupant of the vehicle in a call with the service representative. Processes running in the service center may display to the service representative contextual information about the special condition, the vehicle, and/or the passenger as appropriate to the circumstances. The service software may also display to the service representative a copy of a user interface being displayed to the occupant of the vehicle. To further assist the service agent, the software may display contextual hints for resolving the special condition, such as which services to dispatch and how to respond to the passenger. This may increase the passenger's ease and address difficulties the passenger may have encountered from the special condition. In some cases, the service software may also display contextual hints for interacting with the passenger. The contextual hints may include information about an inferred rider sentiment.

In some embodiments, data science and machine learning methods can be applied to generate a model for an expert engine, in block 504, to take the transformed data as input and output a service agent that is best matched for a given service incident, or a suitable standard operating procedure for handling the given service incident, thereby carrying out at least some of the functionalities of the onboard assistant and/or the AV operator. For instance, the expert engine, with the assistance of the model generated in block 504, can carry out the functionalities in blocks 512 and/or 516. The model can be implemented to take an input vector having predefined features that are most relevant for service incidents. The input vector can include transformed sensor data, e.g., having one or more of the following: collision sensor data, tire pressure sensor data, battery state data, camera data, audio data, rider data, rider sentiment, historical rider data, historical AV data, LIDAR data, RADAR data, weather data, traffic data, gas sensor detector, trip information, AV state classification, etc. The outputs of the model can be predefined to include the types of service agent agents and different standard operating procedures available at the AV operator. Accordingly, the model can process the input vector data and output a prediction, decision, or recommendation (e.g., optimal choice of service agent or selection of standard operating procedures) for how to handle the service incident. Various scores can be generated at the outputs of the model, where the highest score may correspond to the most suitable service agent or standard operating procedure.

The model for the expert engine can be unsupervised, where training of the model is performed without labeled data. In many circumstances, such a model can often consider salient information from AV sensor data for prediction and decision making in ways that human cannot. Examples of data science and machine learning methods applicable for the expert engine includes: neural networks, convolutional neural networks, support vector machines, deep learning, decision trees, multi-output logistic regression, etc.

The model for the expert engine can generate outputs dynamically as the model receives new information, the output vector may change, which may lead to a rerouting of the service incident to a different service agent or a change in the standard operating procedures in resolving the service incident.

In block 518, the system may associate the passenger with a UPID that has been previously assigned to the passenger in block 514. The UPID may be used to correlate the passenger to current and past trips, known preferences, known sentiment, and similar. The system may also receive passenger metadata for the passenger according to the UPID. The system can respond to the rider service session/instance in block 522 according to the UPID, which may include personalizing the response according to the UPID and the rider metadata 520 associated with the UPID. The UPID may be used to improve response to the incident, improve rider satisfaction, and increase rider loyalty. Responses to incidents may also be made more efficient by avoiding having to carry out otherwise ineffective resolutions, or avoiding the need to dispatch a human representative to provide the same or similar level of service.

The UPID may also be associated with a user preferences data store. Depending on user privacy settings, the user preferences associated with the UPID may be shared with the AV operator as part of rider metadata 520. For example, the AV operator may receive the user preferences provided by the user via an end user mobile application. For example, the user may use the mobile application to log in to a ride-hail platform that operates the vehicle.

In another example, rider metadata 520 may include passenger history with an operator of the AV. Metadata may include the number of trips, destinations, time of trips, conditions of trips, rider sentiment, and similar. The rider service platform may combine the passenger history as identified by a UPID with a history of a particular AV. The passenger history may also include a route history. Passenger history may be used to infer, for example, the passenger's preferred routes, most common destinations, or most common routes according to time of day, time of week, or time of month. Rider metadata 520 may also include past rider service incidents according to the UPID. Metadata 520 may be used to determine whether the user has a history or pattern of opening rider service tickets, e.g., for a common complaint or a common type, which may be used to anticipate and mitigate the complaint before it happens.

In block 522, either with or without outside assistance (e.g., with a service representative), the system may resolve the incident to the satisfaction of the parties, or the service session/incident is resolved, e.g., by implementing at least a part of a standard operating procedure that is suited to handle the service incident. Preferably, metadata associated with the passenger (e.g., rider metadata 520) and the sensor data of the AV (e.g., sensor and state logs 502) that triggered the service session are taken into account when resolving the service session/incident. In some cases, the rider metadata 520, including, e.g., user profile data, data associated with past rider service incidents, etc., would be taken into account when resolving the service session/incident. In one example, if the resolution involves rerouting the ride for the passenger, the rider metadata 520 or inferences therefrom may be taken into account to determine a recommended route for the rider.

By way of illustration, personalizing the response based on metadata associated with the UPID of the rider (e.g., rider metadata 520) may include assigning a single human rider service representative or a single human rider service team to the user according to the UPID to resolve the incident. Providing personalized and/or targeted resolutions may increase user satisfaction engagement and help to build brand loyalty. To assist the agent, the system may display to the rider service representative or rider service team a recommended adjustment to the response according to a passenger history or present-state passenger sentiment. Information may be displayed via a human readable display, such as a GUI, a web interface, or other interface.

In some cases, the system may infer a present-state passenger sentiment according to sensor data from the AV (e.g., from sensor and state logs 502) and adjust a response to be performed in block 522 according to the present-state rider sentiment. Present-state rider sentiment may be inferred, for example, from microphones disposed within the AV that may use text-to-speech to monitor the passenger's speech patterns to detect stress, anger, frustration, or similar. The patterns may also be used to detect if the passenger is happy, pleased, or satisfied. Cameras within the AV may also identify non-verbal cues, such as body language, facial expressions, or similar. The present-state passenger sentiment may be used to modify resolutions to incidents in 522.

To further enhance the response, the rider service platform may receive a past history of rider sentiment as part of rider metadata 520, and the system may adjust the resolution to the incident in block 522 according to the present-state passenger sentiment and the past history of rider sentiment. Patterns of For example, some passengers may be more challenging to satisfy than other passengers, the past sentiments during past service incidents indicates that the passenger's frustration or stress tends to increase quickly (or broadly, the passenger sentiment rises to a level of concern more quickly than others, or the passenger sentiment rises in severity at a speed that exceeds a threshold speed), there is a tendency that past service incidents are more severe, or certain resolutions are preferred over others. In those cases, the AV operator may more aggressively modify resolutions or escalate the severity level of a given service incident to satisfy the more challenging riders to enhance brand loyalty and increase rider engagement. In some cases, past rider sentiments are recorded during past service incidents.

In some cases, the rider history provided as rider metadata 520 includes past service incidents, the resolution thereof, and the rider satisfaction rating therefrom (or rider sentiment in response to the resolution). Such rider history may be used to inform the appropriate resolution to a current service incident such as repeating a resolution for a same service incident if the rider was highly satisfied by the past resolution.

In some cases, the system may determine that the passenger has reported a common issue several times based on rider history (as provided as part of rider metadata 520), and adjust the response to a service incident in block 522 according to that determination.

Rider history, as provided in rider metadata 520, can also be used to enhance the user's ride and the resolution to the service incident. For example, the platform may identify an entertainment option according to a passenger history. If the passenger is known to enjoy a particular genre of music, videos, games, or similar, then an appropriate entertainment option may be presented or suggested to the passenger as part of the resolution to an incident.

The system may also personalize a route of the AV, if routing is part of a resolution to a service incident in block 522, according to a passenger history (as provided as part of rider metadata 520). For example, some passengers may prefer a slower or more scenic route that avoids busy freeways, intersections, or other high-stress environments. Other passengers may prefer the fastest available route regardless of the conditions. Thus, passenger history may be used to determine a preferred route for the AV when resolving a service incident in block 522.

In another example, rider history (as provided as part of rider metadata 520) may be used to infer a rider sentiment related to hard braking according to the user history, and the system may adjust driving controls of the AV according to the inference when resolving the service incident in block 522. For example, responses to hard braking or aggressive driving may be used to infer a rider sentiment with response to such factors, and the algorithm that outputs driving controls the AV may adjust its parameters (as part of the resolution to a service incident in block 522) according to a known or suspected rider sentiment inferred from rider history.

In some cases, the system may assess past user sentiments in response to hard braking versus gentle braking. The AV may operate within a range of braking profiles, but some users may react differently to different acceleration and braking profiles. The acceleration and braking profile may affect the speed of the trip. If a service incident indicates that a rider is not satisfied with a current trip, the aggressiveness of driving and/or braking for the ride-hail vehicle may be adjusted according to the user sentiments in response to past trips associated with different braking profiles when resolving the service incident in block 522. Some passengers may prefer a more aggressively driven ride-hail vehicle while others may prefer a more defensively driven ride-hail vehicle.

Rider metadata 520 may aggregate user preferences and past rider history with characteristics of the individual AVs that the user has ridden. For example, the individual AV may have specific mechanical quirks or idiosyncrasies. In one example, if a particular mechanical quirk or idiosyncrasy of a specific AV is of a type that is known to cause adverse user sentiment in a particular passenger, that type of AV may not be dispatched to the particular passenger when resolving a service incident in block 522.

Service sessions/incidents, data associated therewith, rider metadata, and current statuses of and data associated with AVs in the fleet are stored, tracked, and made accessible to the service center to provide a unified system for the service center, such that service representatives can have a holistic view of the vehicles and riders. In addition to being able to resolve a given service incident, this unified system can have provide resolutions to service sessions in block 522 that can only be offered by an AV operator that operates a fleet of AVs with access to such information.

In some cases, the rider metadata 520 may include traceability data sufficient to trace the user to one or more AVs in the fleet of AVs that the passenger has operated or ridden in. The traceability data may be used for purposes, such as to locate a lost item in an AV selected from one or more AVs in the AV operator's fleet. For example, the traceability data may be used in resolving a service incident in block 522 to identify which specific AV the passenger was riding in when an item was lost and may then be used to locate the lost item, secure the lost item, and return lost item to the passenger.

In some cases, the rider service platform may determine that an incident has interrupted a planned trip of the passenger and identify a second AV that may complete the trip or a modified trip as part of the resolution to the incident in block 522. Identifying the second AV may include accounting for user preferences (as provided as part of rider metadata 520). The incident may include, for example, a flat tire or a mechanical failure of the AV that interrupts the passenger's trip. Identifying the second AV may include identifying an AV that the user has ridden before or an AV that the user has previously had a satisfying ride in before. Identifying the second AV may include finding an AV that belongs to a preferred class of AVs. Identifying the second AV may include finding an AV and preloading that AV with the user preferences (e.g., preferred music, preferred cabin temperature, preferences on whether to share a ride with others, etc.). As another enhancement, if an alternative route is required—either within the same AV or in a different AV—the rider service platform may adjust the route to account for user preferences (as provided as part of rider metadata 520).

Once the condition is resolved, in block 596, the method is done.

Exemplary Rider Service Platform

Embodiments of the present specification may enhance user engagement and improve user experience by providing personalization of resolutions to service incidents for the user. For example, an onboard assistant may be triggered either automatically with an event trigger or by a human user pressing an appropriate button, like a help button. The AV operator may store automated event trigger data and button presses in an event database. The AV operator may also store rider metadata in a rider preferences database. Context may be provided for both the passenger and vehicle when resolving a given service incident.

With access to the event database and the rider preferences database, event data may be correlated with a passenger occupying the AV when the event or the button press happen, which allows the AV operator to deal with the issues on both the ride-hail vehicle and for the human passenger at the same time. Also, the AV operator can assign a single rider service representative or a single response team to provide consistent and efficient resolution to service incidents associated a particular rider.

With access to past trips in event database, the platform can readily identify the AV having a lost item belonging to a user with a specific UPID. For example, if a passenger initiates a service incident because she has lost her purse, the AV operator can know exactly what car she was riding in and what seat she was occupying when she lost her purse based on the UPID of the passenger and the event database. The lost item may then be retrieved from the AV and stored in a secure location until the lost item may be returned to the passenger. The AV having the lost item can be routed to a location designated by the passenger to return the lost item to the passenger.

Figure 6:
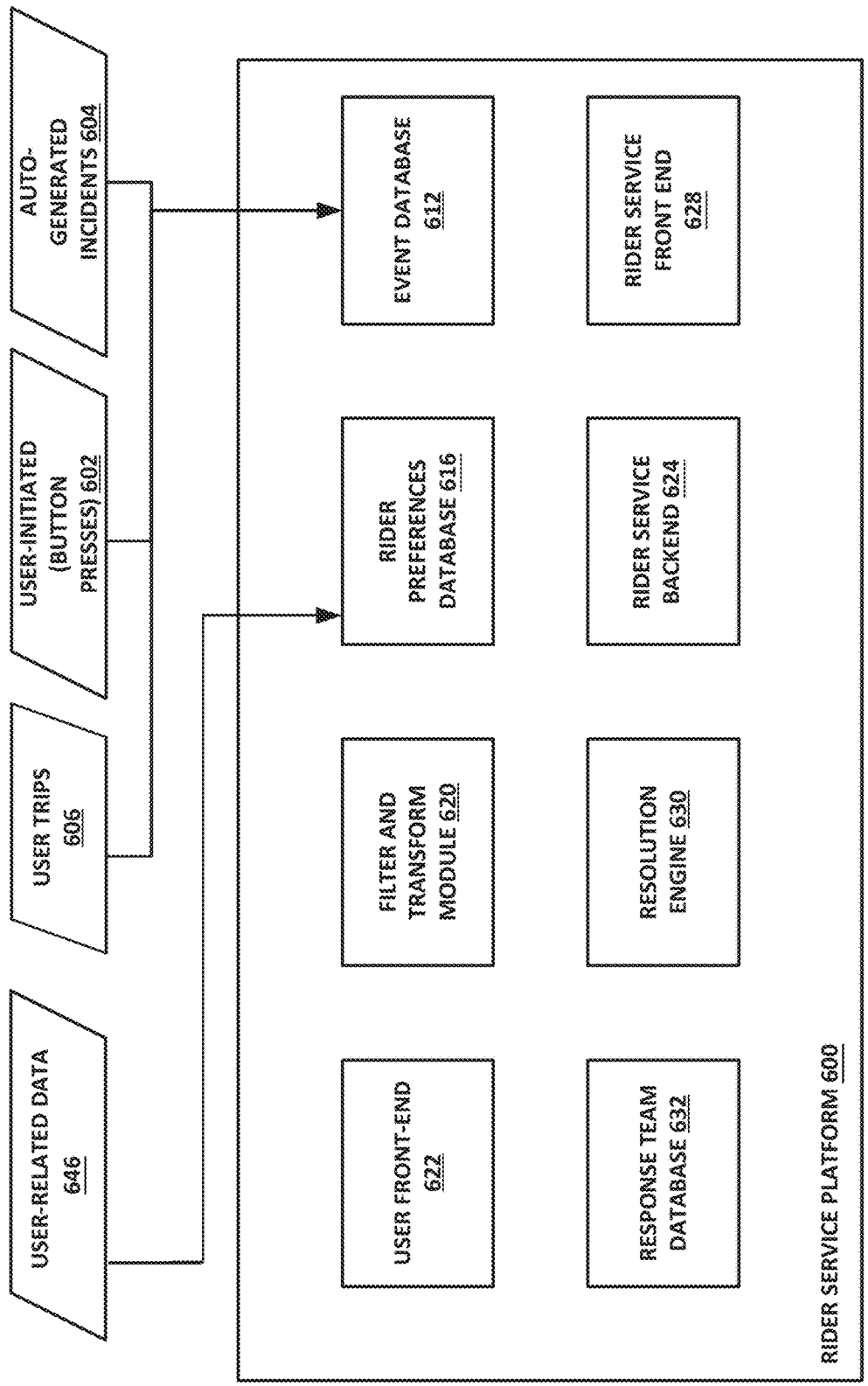
FIG. 6 is a block diagram of selected elements of a rider service (RIDER SERVICE) platform.

FIG. 6 is a block diagram of selected elements of a rider service platform 600 that can achieve some of the benefits described herein.

Rider service platform 600 may receive data associated with user trips 606, data associated with service incidents triggered by user-initiated button presses 602, and data associated with auto-generated (or auto-triggered) service incidents 604 (e.g., service incidents triggered by sensor and state logs of the AV, as described with FIGS. 4-5). These inputs may be collected into an event database 612, which may correlate or cross reference particular events to a UPID that individually identifies a specific passenger within the database. The UPID may be correlated with a passenger ride history, past passenger sentiments, and/or user profile or passenger preferences. Artificial intelligence, machine learning, and/or data science techniques may also be used to generalize specific sentiments or to assess or predict a passenger's reaction to a particular AV, AV condition, driving style, or similar.

The event database 612 may also track which AV the passenger rode in for a particular trip, which AVs are nearby or available for transfer (e.g., if the AV gets a flat tire, then the passenger may be transferred to a different vehicle to complete the trip), or similar. Having such data unified in one system may increase the passenger's enjoyment of the ride-hail vehicle experience, increase rider engagement, and increase repeat riders and brand loyalty. Furthermore, by correlating the rider's experience and sentiment with individual AVs, the system may correlate user sentiment to specific AVs and their idiosyncrasies. For example, a passenger may have a particular fondness for a specific AVs color, configuration, amenities, scent, or other features. Consistently riding in the specific AV that the passenger prefers (or an AV with similar properties) may increase enjoyment and loyalty.

The rider service platform 600 may have access to a rider preferences database 616, which may include data that the passenger has voluntarily shared according to privacy settings, such as on a mobile application. The mobile application may include personal information (from user-related data 646) that the rider may elect to share such as name, address, birth date, contacts, emergency contacts, medical alert data, dietary preferences, religious preferences, music or entertainment preferences, or others. These preferences may be useful in personalizing the passenger's experience, such as resolutions to service incidents, to provide increased passenger satisfaction.

Broadly speaking, rider preferences database 616 may include a wide variety of user-related data 646 (sometimes referred to broadly as rider metadata) may be used to personalize the user experience in the AV. These data may include rider social media interactions, interactions with the AV's onboard tablet, destinations selected by the rider, average time or distance to destination, rider interactions with the AV operator's website or smart phone/tablet application, the rate at which the rider opens or interacts with notifications from the app, results of interactions (e.g., did the rider request a trip, visit an advertiser, or take some other action), usage across different business lines (e.g., has the user both used a ride-share and had one or more deliveries), changes in loyalty (e.g., was the user previously an occasional user, and is now a frequent user, or vice versa), responses to post-service rider surveys, user accessibility or disability settings, whether and how many support cases the rider has filed, features the rider interacts with, and others.

In some cases, user-related data may be used to assess the rider's sentiment and posture with respect to the AV operator and personalize the user's experience (such as resolutions to service incidents) appropriately. Personalization may include personalization of the rider service experience, personalization of the ride experience (e.g., how the AV operates while the rider is riding), or others. These data may also be useful in determining if the rider is likely to cease using the service altogether, or seek another provider, and help the operator to take appropriate action to prevent loss of return riders when handling a service incident.

A filter and transform module 620 may include an algorithm that receives inputs, such as AV sensor data, events, raw user sentiment data, trips, demographic data, or other data, and applies filters to the data. The filters may transform the data into usable inferences about user sentiment, and user preferences. The filters may in some cases output instructions for modifying operation of a particular AV (or for selecting suitable standard operating procedures to resolve a particular service incident) to increase passenger satisfaction, engagement, and/or loyalty. Filter may apply artificial intelligence, machine learning, and/or data science techniques. Illustrative implementations of the filter and transform module 620 are described with FIG. 5.

User frontend 622 may include a user interface, such as a GUI, which may be displayed to the passenger, for example, via a tablet or other touchscreen on the AV. A tablet or touchscreen is used as an illustrative and non-limiting example, and other types of interfaces may be used. In another example, the passenger's own cell phone or mobile device may include a user interface that may interoperate with the AV.

A rider service backend 624 may provide backend data processing services to enhance the passenger's personalized experience. For example, this may include routing rider service tickets to a particular agent or team, providing suggestions on how to interact with a particular rider, dispatching ride-hail vehicles, queuing ride-hail vehicles for service, modifying trips, or performing other services. Rider service backend 624 may interact both with user frontend 622 and with a rider service frontend 628. Rider service frontend 628 may include a user interface that rider service agents may access to perform their functions. For example, Rider service backend 624 may visually, verbally, or textually communicatively couple rider service agents to the passenger.

Resolution engine 630 may include an expert engine that may provide a method of resolving a rider service ticket. The engine 630 may output automated services that may be performed by the AV or for the AV or may include connecting the passenger to a rider service agent and optionally providing recommendations for helping the rider service agent to resolve the ticket. For example, if an AV encounters a flat tire, then rider service backend 624 may be notified of the change in tire pressure, from which a flat tire is inferred by filter and transform module 620. The AV may stop so as not to cause damage to the vehicle, the occupants, or to third parties. Rider service backend 624 may query resolution engine 630 for a resolution to the situation. The resolution may include several steps, such as for example, dispatching a service call to a contractor who provides flat tire services. The third-party contractor may go to the site, change the tire, or tow the AV as appropriate to respond to the situation. Illustrative implementations of the expert engine of the resolution engine 630 are described with FIG. 5.

In some cases, a rider service agent may operate rider service frontend 628 to connect with the passenger optionally via a user frontend 622. The video of the rider service agent, or an avatar of the agent may be displayed via the user frontend 622 to assure the passenger that help is on the way, may inform the passenger of why the AV has stopped, and may also remain on the line with the passenger to answer questions or resolve concerns.

In some cases, resolution engine 630 may identify a nearby ride-hail vehicle that is suitable for the passenger. For example, the resolution may include identifying a ride-hail vehicle that has an appropriate number of seats for the passenger's party or identifying a ride-hail vehicle that is of a preferred color, configuration, or that is otherwise suitable for completing the passenger's trip (based on information in rider preferences database 616). Resolution engine 630 may dispatch the new ride-hail vehicle, which may proceed to the location of the stopped AV, pick up the passenger or passenger's party, and finish the trip.

Response team database 632 may include a database of rider service agents or response teams. Specific agents or teams may be correlated or associated with a UPID that uniquely identifies the passenger. Consistency in rider service experience may enhance the user's engagement with the AV operator and increase brand loyalty. Thus, a single response team or rider service agent may be assigned to a particular passenger and may consistently handle incidents with the passenger.

Figure 7:
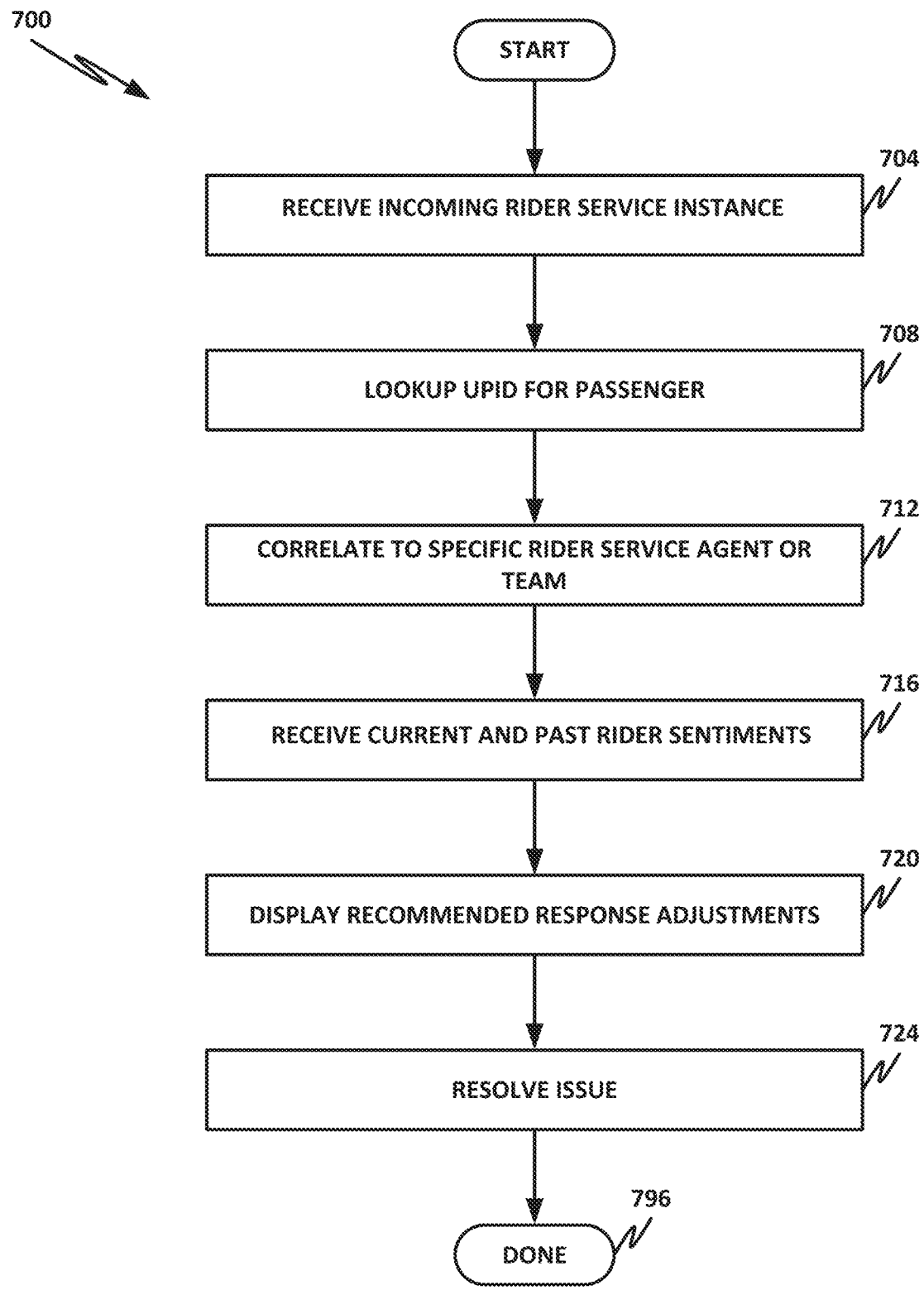
FIG. 7 is a flowchart of selected elements of a method that may be performed by a rider service platform.

Exemplary Unified and Personalized Approach to Responding to Rider Service Requests FIG. 7 is a flowchart of a method 700 that may be performed, for example, by a rider service platform, such as rider service platform 600 of FIG. 6.

Starting in block 704, the rider service platform may receive an incoming rider service instance. The instance may include a button press by the passenger expressly requesting contact with the rider service team, or it may include a data-driven event triggered by sensors on the AV.

In block 708, the rider service platform may look up the UPID for the current passenger. The UPID may be used to identify preferences, personalizations, or similar.

In block 712, the rider service platform identifies a rider service agent or team according to the UPID, which may be a specific rider service agent or team that is assigned to the passenger for purposes of consistency.

In block 716, the rider service platform may receive current and past passenger sentiments. The current-state and/or past passenger sentiments may be used to build a personalized and empathetic response to the passenger's current situation. The current and past sentiment may also help a rider service agent know how best to help the passenger and an appropriate tone to adopt for the interaction.

In block 720, the rider service platform may display recommended response adjustments according to the UPID and sentiments. The response adjustments may be part of a comprehensive resolution engine that may also perform automated tasks, such as dispatching services, dispatching a substitute ride-hail vehicle, connecting the passenger with a particular party, such as an emergency contact, making an automated call to rider service team, or similar. The rider service agent may then address the rider's concerns and appropriately resolve the issue.

In block 724, the issue is resolved, and the passenger may continue the trip or otherwise end the service incident.

In block 796, the method is done.

Exemplary Hardware Platform

FIG. 8 is a block diagram of a hardware platform 800. Although a particular configuration is illustrated here, there are many different configurations of hardware platforms, and this embodiment is intended to represent the class of hardware platforms that may provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Hardware platform 800 may provide a suitable structure for controller 104 of FIG. 1, for AV controller 200 of FIG. 2, for carrying out the functionalities and systems illustrated in FIGS. 5-7, as well as for other computing elements illustrated throughout this specification, including elements external to AV 102. Depending on the embodiment, elements of hardware platform 800 may be omitted, and other elements may be included.

Hardware platform 800 is configured to provide a computing device. In various embodiments, a "computing device" may be or comprise, by way of non-limiting example, a computer, system-on-a-chip (SoC), workstation, server, mainframe, virtual machine (whether emulated or on a "bare metal" hypervisor), network appliance, container, a data center, a communications service provider infrastructure, an in-memory computing environment, a computing system of a vehicle (e.g., an automobile or airplane), embedded computer, embedded controller, embedded sensor, smart phone, tablet computer, wearable computer, or any other electronic device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used. The PtP configuration may be an internal device bus that is separate from CAN bus 170 of FIG. 1, although in some embodiments they may interconnect with one another.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system (OS) 806, control functions 808, or data 812.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Processors 802 may be any type of processor and may communicatively couple to chipset 816 via, for example, PtP interfaces. Chipset 816 may also exchange data with other elements. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. Memory 804 may include any form of volatile or nonvolatile memory. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality. In certain embodiments, memory 804 may comprise a relatively low-latency volatile main memory, while storage 850 may comprise a relatively higher-latency nonvolatile memory. However, memory 804 and storage 850 need not be physically separate devices, and in some examples may simply represent a logical separation of function (if there is any separation at all).

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that may coordinate to achieve a logical operation.

Chipset 816 may be in communication with a bus 828 via an interface circuit. Bus 828 may have one or more devices that communicate over it, such as a bus bridge 832, I/O devices 835, accelerators 846, and communication devices 840, by way of non-limiting example. In general terms, the elements of hardware platform 800 may be coupled together in any suitable manner. For example, a bus may couple any of the components together.

Communication devices 840 may broadly include any communication not covered by a network interface and the various I/O devices described herein. Devices may include, serial or parallel devices that provide communications. In a particular example, communication device 840 may be used to stream and/or receive data within a CAN.

I/O devices 835 may be configured to interface with any auxiliary device that connects to hardware platform 800 but that is not necessarily a part of the core architecture of hardware platform 800. A peripheral may be operable to provide extended functionality to hardware platform 800 and may or may not be wholly dependent on hardware platform 800. Peripherals may include input and output devices such as displays, terminals, printers, keyboards, mice, modems, data ports, network controllers, optical media, external storage, sensors, transducers, actuators, controllers, data acquisition buses, cameras, microphones, speakers, or external storage, by way of non-limiting example.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), and/or accelerators 846. In alternative embodiments, any portions of the bus architectures could be implemented with one or more PtP links.

OS 806 may be an embedded or real-time operating system. In some embodiments, a hardware platform 800 may function as a host platform for one or more guest systems that invoke application (e.g., control functions 808).

Control functions 808 may include one or more computing engines that may include one or more non-transitory computer-readable mediums having stored thereon executable instructions operable to instruct a processor to provide operational functions. At an appropriate time, such as upon booting hardware platform 800 or upon a command from OS 806 or a user or security administrator, a processor 802 may retrieve a copy of the operational agent (or software portions thereof) from storage 850 and load it into memory 804. Processor 802 may then iteratively execute the instructions of control functions 808 to provide the desired methods or functions.

There are described throughout this specification various engines, modules, agents, servers, applications, or functions. Each of these may include any combination of one or more logic elements of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. The engine may also include other hardware, software, and/or data, including configuration files, registry entries, application programming interfaces (APIs), and interactive or user-mode software by way of non-limiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language. These may be used with any compatible operating systems or operating environments. Hardware elements may be designed manually, or with a hardware description language. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Communication devices 840 may communicatively couple hardware platform 800 to a wired or wireless network or fabric. A "network," as used throughout this specification, may include any communicative platform operable to exchange data or information within or between computing devices. A network interface may include one or more physical ports that may couple to a cable (e.g., an Ethernet cable, other cable, or waveguide), or a wireless transceiver.

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all the functions of a physical hardware platform.

In a general sense, any suitably configured processor may execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein may be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

VARIATIONS AND IMPLEMENTATIONS

AVs may also be used for many other purposes, including by way of illustrative and non-limiting example, personal vehicles (which may be fully autonomous, or provide hybrid autonomous/driver assist modes), automated cargo vehicles, delivery drones, autonomous trains, autonomous aircraft, or similar. Any such vehicle may benefit from an onboard assistant as described in this specification.

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a circuit, module, or system. In at least some cases, a circuit may include the physical hardware of the circuit, plus any hardware or firmware that programs or configures the circuit. For example, a network circuit may include the physical network interface circuitry, as well as the logic (software and firmware) that provides the functions of a network stack.

Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices and/or their controllers, etc.) or be stored upon manufacturing of these devices and systems.

The foregoing detailed description presents various descriptions of specific certain embodiments. However, the innovations described herein may be embodied in a multitude of different ways, for example, as defined and covered by the claims and/or select examples. In the following description, reference is made to the drawings where like reference numerals may indicate identical or functionally similar elements. It will be understood that elements illustrated in the drawings are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings.

The preceding disclosure describes various illustrative embodiments and examples for implementing the features and functionality of the present disclosure. While components, arrangements, and/or features are described below in connection with various example embodiments, these are merely examples used to simplify the present disclosure and are not intended to be limiting.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The "means for" in these instances (above) may include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A method of resolving service instances to riders participating in a ride-hail service provided by a fleet of autonomous vehicles (AVs), comprising:
    navigating an AV to provide a trip to a passenger;
    associating the passenger with a unique passenger identifier (UPID);
    receiving passenger metadata for the passenger according to the UPID;
    monitoring, by the AV while navigating, for a passenger service instance;
    triggering, by one or more sensors on the AV, a data-driven event, wherein information relating to the data-driven event includes AV sensor data and a state of a user interface being displayed to the passenger within the AV;
    triggering, by an AV controller, a passenger-initiated event based on a passenger-initiated button press within the AV;
    determining, by the AV while navigating, an occurrence of the passenger service instance based on the triggering of the data-driven event and the passenger-initiated event;
    establishing a connection between the AV and a service center;
    identifying event data associated with other passenger service instances of the ride-hail service;
    displaying, by the service center, contextual information regarding the passenger service instance to a service representative, the contextual information including the AV sensor data, a copy of the user interface being displayed to the passenger, and the event data associated with other passenger service instances; and
    responding to the passenger service instance, comprising customizing the response to the passenger service instance according to the UPID, the passenger metadata, and the event data associated with other passenger service instances.

2. The method of claim 1, wherein customizing the response comprises assigning the service representative to the passenger according to the UPID.

3. The method of claim 1, wherein the passenger metadata comprises traceability data sufficient to trace the passenger to one or more AVs that the passenger has ridden in.

4. The method of claim 1, further comprising:
    aggregating and storing data associated with passenger service instances triggered by passenger-initiated button presses and data associated with passenger service instances triggered by sensor and state logs of AVs as the event data.

5. The method of claim 1, further comprising:
    storing data associating with passenger trips as the event data.

6. The method of claim 1, wherein responding to the passenger service instance comprises:
    determining the trip has been interrupted;
    identifying, from passenger metadata, a further AV to complete the trip, wherein identifying comprises determining that the further AV belongs to a type of AV to which the passenger had responded positively based on the UPID, the passenger metadata, and the event data; and
    routing the further AV to complete the trip.

7. The method of claim 1, wherein:
    the passenger service instance is initiated due to a lost item; and
    customizing the response comprises identifying an AV the passenger was riding in and a seat in which the passenger occupied based on the UPID, the passenger metadata, and the event data.

8. A system for resolving service instances to riders participating in a ride-hail service provided by a fleet of autonomous vehicles (AVs), comprising:
    an AV of the fleet of AVs, the AV comprising an onboard computer configured to:
        navigate to provide a trip to a passenger,
        monitor for a passenger service instance,
        trigger a data-driven event, wherein information relating to the data-driven event includes AV sensor data and a state of a user interface being displayed to the passenger within the AV,
        trigger a passenger-initiated event based on a passenger-initiated button press within the AV, and
        determining an occurrence of the passenger service instance based on the triggering of the data-driven event and the passenger-initiated event; and
    a central computer in communication with the fleet of AVs comprising:
        at least one processor circuit;
        a memory; and
        instructions encoded within the memory to instruct the at least one processor circuit to:
            associate the passenger with a unique passenger identifier (UPID),
            receive passenger metadata for the passenger according to the UPID,
            identify event data associated with other passenger service instances of the ride-hail service,
            display contextual information regarding the passenger service instance to a service representative, the contextual information including the AV sensor data, a copy of the user interface being displayed to the passenger, and the event data associated with other passenger service instances, and
            respond to the passenger service instance, comprising customizing the response to the passenger service instance according to the UPID, the passenger metadata, and the event data associated with other passenger service instances.

9. The computing system of claim 8, wherein the instructions are further to instruct the at least one processor circuit to:
    assign the service representative to the passenger according to the UPID.

10. The computing system of claim 8, wherein the passenger metadata comprises traceability data sufficient to trace the passenger to one or more AVs that the passenger has ridden in.

11. The computing system of claim 8, wherein the instructions are further to instruct the at least one processor circuit to:
    aggregate and store data associated with passenger service instances triggered by passenger-initiated button presses and data associated with passenger service instances triggered by sensor and state logs of AVs as the event data.

12. The computing system of claim 8, wherein the instructions are further to instruct the at least one processor circuit to:
store data associating with passenger trips as the event data.

13. The computing system of claim 8, wherein responding to the passenger service instance comprises:
determining the trip has been interrupted;
identifying, from passenger metadata, a further AV to complete the trip, wherein identifying comprises determining that the further AV belongs to a type of AV to which the passenger had responded positively based on the UPID, the passenger metadata, and the event data; and
routing the further AV to complete the trip.

14. The computing system of claim 8, wherein:
the passenger service instance is initiated due to a lost item; and
customizing the response comprises identifying an AV the passenger was riding in and a seat in which the passenger occupied based on the UPID, the passenger metadata, and the event data.

15. One or more tangible, non-transitory computer-readable storage media having stored thereon executable instructions to instruct a processor to:
navigate an autonomous vehicle (AV) to provide a trip to a passenger;
associate the passenger with a unique passenger identifier (UPID);
receive passenger metadata for the passenger according to the UPID;
monitor, by the AV while navigating, for a passenger service instance;
trigger, by one or more sensors on the AV, a data-driven event, wherein information relating to the data-driven event includes AV sensor data and a state of a user interface being displayed to the passenger within the AV;
trigger, by an AV controller, a passenger-initiated event based on a passenger-initiated button press within the AV;
determine, by the AV while navigating, an occurrence of the passenger service instance based on the triggering of the data-driven event and the passenger-initiated event;
establish a connection between the AV and a service center;
identify event data associated with other passenger service instances of the ride-hail service;
display, by the service center, contextual information regarding the passenger service instance to a service representative, the contextual information including the AV sensor data, a copy of the user interface being displayed to the passenger, and the event data associated with other passenger service instances;
respond to the passenger service instance, comprising customizing the response to the passenger service instance according to the UPID, the passenger metadata, and the event data associated with other passenger service instances.

16. The one or more tangible, non-transitory computer-readable storage media of claim 15, wherein the executable instructions are to further instruct a processor to:
assign the service representative to the passenger according to the UPID.

17. The one or more tangible, non-transitory computer-readable storage media of claim 15, wherein the executable instructions are to further instruct a processor to:
aggregate and store data associated with passenger service instances triggered by passenger-initiated button presses and data associated with passenger service instances triggered by sensor and state logs of AVs as the event data.

18. The one or more tangible, non-transitory computer-readable storage media of claim 15, wherein the executable instructions are to further instruct a processor to:
store data associating with passenger trips as the event data.

19. The one or more tangible, non-transitory computer-readable storage media of claim 15, wherein responding to the passenger service instance comprises:
determining the trip has been interrupted;
identifying, from passenger metadata, a further AV to complete the trip, wherein identifying comprises determining that the further AV belongs to a type of AV to which the passenger had responded positively based on the UPID, the passenger metadata, and the event data; and
routing the further AV to complete the trip.

20. The one or more tangible, non-transitory computer-readable storage media of claim 15, wherein:
the passenger service instance is initiated due to a lost item; and
customizing the response comprises identifying an AV the passenger was riding in and a seat in which the passenger occupied based on the UPID, the passenger metadata, and the event data.

\* \* \* \* \*